United States Patent [19]
Sugaya et al.

[11] Patent Number: 4,778,435
[45] Date of Patent: Oct. 18, 1988

[54] HYDRAULIC CONTROL SYSTEM FOR CONTINUOUSLY VARIABLE TRANSMISSION FOR AUTOMOTIVE VEHICLE

[75] Inventors: Masami Sugaya; Katsumi Kouno; Yoshinobu Soga, all of Susono; Susumu Okawa, Aichi, all of Japan

[73] Assignee: Toyota Jidosha Kabushiki Kaisha, Japan

[21] Appl. No.: 16,559

[22] Filed: Feb. 19, 1987

[30] Foreign Application Priority Data

Feb. 22, 1986 [JP] Japan ................................ 61-37572

[51] Int. Cl.⁴ .......................................... F16H 11/04
[52] U.S. Cl. ........................................ 474/28; 474/18; 74/868
[58] Field of Search .................... 474/28, 18; 74/867–869

[56] References Cited

U.S. PATENT DOCUMENTS

| | | | |
|---|---|---|---|
| 3,600,960 | 8/1971 | Karig et al. | 474/28 X |
| 4,628,773 | 12/1986 | Itoh et al. | 474/28 X |
| 4,663,991 | 5/1987 | Nakamura et al. | 74/868 |
| 4,669,336 | 6/1987 | Okada et al. | 474/28 X |

FOREIGN PATENT DOCUMENTS

| | | |
|---|---|---|
| 63786 | 11/1982 | European Pat. Off. . |
| 151535 | 8/1985 | European Pat. Off. . |
| 168540 | 1/1986 | European Pat. Off. . |
| 2703487 | 8/1977 | Fed. Rep. of Germany . |
| 2946295 | 5/1981 | Fed. Rep. of Germany . |
| 52-98861 | 2/1977 | Japan . |
| 58-29424 | 7/1983 | Japan . |

*Primary Examiner*—Thuy M. Bui
*Attorney, Agent, or Firm*—Parkhurst & Oliff

[57] ABSTRACT

A hydraulic control system for a continuously variable transmission for an automotive vehicle, the transmission having a first and a second variable-diameter pulley provided on respective first and second shafts, a belt connecting the first and second pulleys, and a first and a second hydraulic cylinder for changing effective diameters of the first and second pulleys. The control system includes a first pressure regulating valve for regulating the pressure of a fluid delivered from a pressure source, and thereby establishing a first line pressure, a shift-control valve for applying the first line pressure to one of the first and second cylinders, while simultaneously permitting a flow of the fluid from the other cylinder, thereby changing the effective diameters of the first and second pulleys, and a second pressure regulating valve for regulating the pressure of one of a first and a second discharge flow of the fluid from the respective first and second cylinders through the shift-control valve, and thereby establishing a second line pressure lower than the first line pressure. A relief line is provided for releasing the other of the first and second discharge flows of the fluid. The relief line is exposed to a substantially atmospheric pressure.

5 Claims, 7 Drawing Sheets

HYDRAULIC CONTROL SYSTEM FOR CONTINUOUSLY VARIABLE TRANSMISSION FOR AUTOMOTIVE VEHICLE

BACKGROUND OF THE INVENTION

1. Field of the Invention

The present invention relates to improvements in a hydraulic control system for a continuously variable transmission of a belt-and-pulley type for an automotive vehicle.

2. Discussion of the Related Art

A belt-and-pulley type of continuously variable transmission for an automotive vehicle is known. This transmission includes a first shaft, a second shaft, a first variable-diameter pulley provided on the first shaft, a second variable-diameter pulley provided on the second shaft, a transmission belt connecting the first and second pulleys to transmit power from the first shaft to the second shaft, a first hydraulic cylinder for changing an effective diameter of the first pulley, and a second hydraulic cylinder for changing an effective diameter of the second pulley. An example of a hydraulic control system for this type of continuously variable transmission is disclosed in Laid-open publication No. 52-98861 (published in 1977) of Japanese Patent Application, wherein the belt tension is adjusted primarily by regulating the pressure of a flow of a working fluid supplied to the second hydraulic cylinder (provided on the second or driven shaft), whereas the speed ratio of the transmission is controlled primarily by regulating the pressure of a flow of the fluid supplied to or discharged from the first hydraulic cylinder (provided on the first or drive shaft).

In such a hydraulic control system, a single line pressure regulated in relation to the speed ratio of the transmission is provided to activate the second hydraulic cylinder primarily for maintaining a suitable tension of the transmission belt. The line pressure is also applied to the first hydraulic cylinder, via a flow control valve which functions to control the speed ratio of the transmission. In this arrangement, the rates of flow of the fluid to and from the first cylinder change with the line pressure, that is, with the speed ratio of the transmission. Therefore, it is inevitable that the rate at which the speed ratio is changed is affected by the specific current speed ratio. Accordingly, the above-indicted hydraulic control system tends to fail to provide a sufficient response in the control of the speed ratio, while the transmisson is in a transient condition, that is, operating at a changing speed ratio. Further, when the direction of power transmission is reversed due to an engine braking effect, the belt tension is primarily controlled by the first cylinder while the speed ratio is regulated by the second cylinder, whereby the belt tension and the speed ratio cannot be suitably controlled.

Another hydraulic control system for a continuously variable transmission is disclosed in Publication No. 58-29424 (published in 1983 for opposition purpose) of Japanese Patent Application, wherein a control valve (four-way valve) is used to change the speed ratio of the transmission by feeding a working fluid from a hydraulic source to one of the two hydraulic cylinders, and at the same time allowing the fluid to be discharged from the other cylinder. The control system further uses an electromagnetic relief valve for regulating the pressure of the fluid which is delivered from the control valve.

In the hydraulic control system indicated above, a comparatively high pressure is applied to the hydraulic cylinder for the pulley provided on the drive shaft, i.e., to one of the two cylinders which is subject to a relatively high pressure due to power transmission in the direction from the drive shaft to the driven shaft of the transmission. The other cylinder is supplied with the pressure which is regulated by the electromagnetic relief valve. According to this arrangement, the belt tension and the speed ratio of the transmission can be suitably controlled, even when the direction of power transmission is reversed.

Problems Solved by the Invention

In the conventional continuously variable transmission, however, the pressure of the fluid delivered by the hydraulic source is not regulated, but is merely maintained at a predetermined level by an ordinary pressure relief valve. Hence, the rate of change in the speed ratio or the shifting response of the transmission may have relatively large variations, due to changes in the fluid pressure levels within the hydraulic cylinders according to a change in the torque transmitted by the transmission and a change in the speed ratio of the transmission. It is possible to set the pressure of the hydraulic source at a level high enough to permit a sufficiently high rate of change in the speed ratio over the entire operating range of the transmission. In this case, however, the system suffers from increased power loss due to maintenance of the high pressure throughout the operation of the transmission.

SUMMARY OF THE INVENTION

It is accordingly an object of the present invention to provide a hydraulic control system for a continuously variable transmission for an automotive vehicle, which permits an excellent shifting response, and minimum loss of power for operating the transmission.

The above object may be achieved according to the present invention, which provides a hydraulic control system for a continuously variable transmission of a belt-and-pulley type for an automotive vehicle, the transmission having a first and a second shaft, a first and a second variable-diameter pulley provided on the first and second shafts, respectively, a transmission belt connecting the first and second pulleys to transmit power from one of the pulleys to the other, and a first and a second hydraulic cylinder for changing effective diameters of the first and second pulleys, the hydraulic control system comprising a hydraulic pressure source for pressurizing a working fluid, a first pressure regulating valve, a shift-control valve, a second pressure regulating valve and a relief line. The first pressure regulating valve is adapted to regulate the pressure of the pressurized fluid delivered from the hydraulic pressure source, thereby establishing a first line pressure. The shift-control valve applies the first line pressure to one of the first and second hydraulic cylinders, while simultaneously permitting a flow of the fluid from the other hydraulic cylinder, thereby changing the effective diameters of the first and second pulleys to control a speed ratio of the transmission. The second pressure regulating valve is adapted to regulate the pressure of one of a first and a second discharge flow of the fluid from the respective first and second hydraulic cylinders through the shift-control valve, and to thereby establish a second line pressure which is lower than the first line pressure. The relief line is exposed to a substantially atmospheric pressure, and serves to release the other of the first and second discharge flows of the fluid from the respective first and second hydraulic cylinders.

In the hydraulic control system of the present invention arranged as described above, the first and second line pressures are prepared by the first and second pressure regulating valves. In this arrangement, a difference between the first and second line pressures determines a flow of the fluid to be fed into one of the first and second hydraulic cylinders, or a flow of the fluid to be discharged from the other hydraulic cylinder. Therefore, the rate at which the speed ratio of the transmission is changed, is solely determined by the difference between the first and second line pressures, irrespective of the current speed ratio of the transmission. Accordingly, the transmission can be shifted with an improved response to required changes in the speed ratio. Further, the first line pressure may be controlled in relation to the current engine output of the vehicle, and the second line pressure, so that the first line pressure is optimum, i.e., maintained at a required minimum level, for permitting a sufficiently high rate of change in the speed ratio, while minimizing a power loss of the hydraulic pressure source. On the other hand, the second line pressure may be controlled in relation to the current speed ratio and transmission torque, so that the second line pressure is maintained at a required minimum level, so as to give a suitable amount of tension to the belt, enabling the transmission to operate without a slip of the belt on the pulleys. Thus, the instant hydraulic control system provides an advantage of minimizing the power loss of the vehicle due to the use of unnecessarily high pressure for activating the cylinders.

Another advantage is offered by the relief line which releases the fluid discharged from the first or second hydraulic cylinder through the shift-control valve. Since the relief line is exposed substantially to the atmospheric pressure, the pressure in the cylinder from which the fluid is discahrged through the reilief line can be changed over a relatively wide range between the atmospheric pressure and the first line pressure. In other words, one of the first and second cylinders can be drained at a high speed, whereby the speed ratio of the transmission can be rapidly increased or decreased. Accordingly, the instant hydraulic control system provides an improvement in the operating response of the transmission or the drivability of the vehicle, for a shift-down or shift-up operation of the transmission. For example, the instant hydraulic control system suitably eliminates otherwise possible slow acceleration of the vehicle after a sudden stop.

According to one feature of the invention, the first shaft on which the first hydraulic cylinder is provided, is connected to the engine of the vehicle, so that the first shaft normally functions as a drive shaft of the transmission. In this case, it is preferred that the second pressure regulating valve regulates the pressure of the second discharge flow of the fluid from the second hydraulic cylinder, while the relief line releases the first discharge flow of the fluid from the first hydraulic cylinder on the first or drive shaft. The first discharge flow is drained through the relief line to a suitable portion of the system which is substantially under the atmospheric pressure. According to this arrangement, the shift-down speed of the transmission can be increased, and the drivability of the vehicle during acceleration after a sudden stop can be improved.

According to another feature of the invention, the hydraulic pressure source comprises an oil pump, and the relief line is connected to a suction line connected to the oil pump.

According to a further feature of the invention, the working fluid is stored in a reservoir under the atmospheric pressure, and the hydraulic pressure source comprises an oil pump for pumping up the fluid from the reservoir. The relief line releases the first discharge flow of the fluid from the first hydraulic cylinder, into the reservoir.

According to a still further feature of the invention, the relief line has a flow restrictor for limiting a rate of the first discharge flow of the fluid from the first hydraulic cylinder, and thereby giving a back pressure to the first hydraulic cylinder. In this arrangement, the maximum rate of change in the speed ratio can be set at an optimum level by the flow restrictor.

BRIEF DESCRIPTION OF THE DRAWINGS

The above and optional objects, features and advantages of the present invention will become more apparent by reading the following detailed description of preferred embodiments of the invention, when considered in connection with the accompanying drawings, in which.

DETAILED DESCRIPTION OF THE PREFERRED EMBODIMENTS

The preferred embodiments of the present invention will be described in detail.

Figure 1:
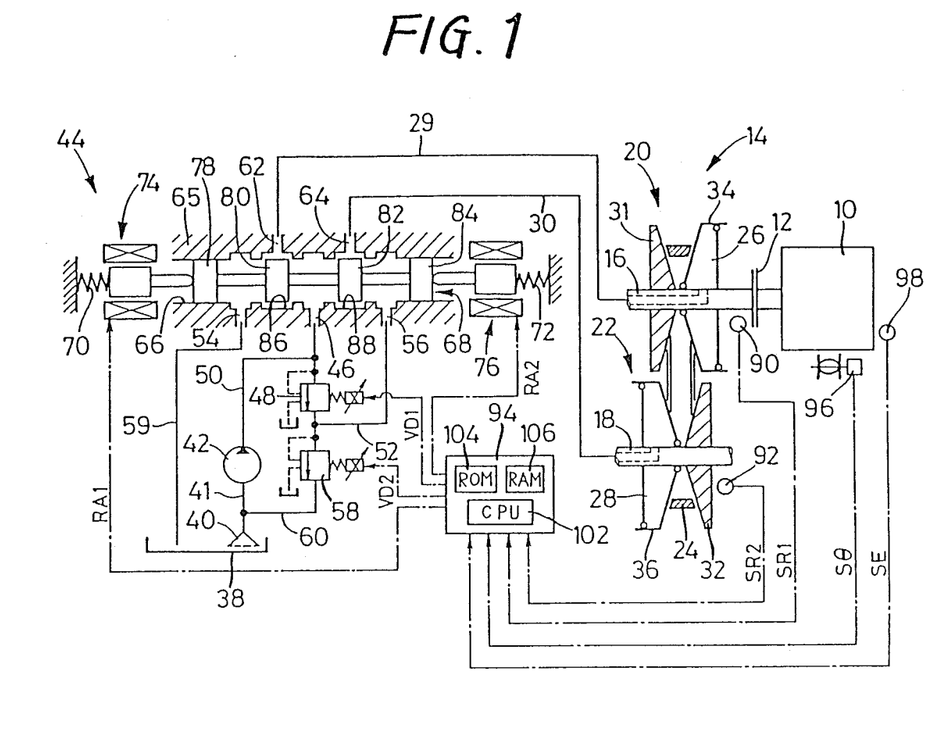
FIG. 1 is a schematic view showing an arrangement of one embodiment of a hydraulic control system of the present invention for controlling a continuously variable transmission.

Referring first to FIG. 1, there is shown a hydraulic control system for a continuously variable transmission 14 of a belt-and-pulley type for an automotive vehicle. The transmission 14 includes a first shaft 16 to which an output of an engine 10 of the vehicle is transmitted via a clutch 12.

The continuously variable transmission 14 including the first shaft 16 further includes a second shaft 18, a first variable-diameter pulley 20 provided on the first shaft 16, a second variable-diameter pulley 22 provided on the second shaft 18, a belt 24 connecting the first and second pulleys 20, 22 to transmit power between the first and second shafts 16, 18, a first hydraulic cylinder 26 for changing an effective diameter of the first pulley 20, and a second hydraulic cylinder 28 for changing an effective diameter of the second pulley 22. These first and second hydraulic cylinders 26 and 28 have the same pressure-receiving areas, and the first and second pulleys 20 and 22 have the same size, so that the continuously variable transmission 14 as a whole is relatively small-sized. The first pulley 20 has an axially stationary rotor 31 fixed to the first shaft 16, and an axially movable rotor 34 which is axially movable on the first shaft 16, cooperating with the stationary rotor 31 to form therebetween a V-groove having a variable width. Similarly, the second pulley 22 has an axially stationary rotor 32 and an axially movable rotor 36, which are provided on the second shaft 18 so as to form therebetween a variable-width V-groove.

An output of the second shaft 18 of the continuously variable transmission 14 is transmitted to drive wheels of the vehicle, via an auxiliary transmission, a differential gear, and other units, all of which are not shown.

The thus constructed power transmission system of the vehicle is operated by a hydraulic control system, which is arranged as described below. The power transmission system uses an oil reservoir 38 which is open to the atmosphere, and to which a working fluid is returned. The fluid in the reservoir 38 is pumped up by an oil pump 42 via a strainer 40 and a suction line 41. The thus pressurized fluid is fed to a first pressure line 50, which is connected to an input port 46 of a shift-control valve 44, and to a first pressure regulating valve 48. In the present embodiment of the hydraulic control system, the oil pump 42 constitutes a hydraulic power source, and is driven by the engine 10 via a drive shaft not shown. The first pressure regulating valve 48 is operated in response to a first VALVE DRIVE signal VD1 (which will be described), to release a portion of the fluid in the first pressure line, into a second pressure line 52, and thereby regulate a first line pressure Pl1 in the first pressure line 50. The second pressure line 52 is connected to a second drain port 56 of the shift-control valve 44, and to a second pressure regulating valve 58. This second pressure regulating valve 58 is operated in response to a second VALVE DRIVE signal VD2 (which will be described), to release a portion of the fluid in the second pressure line 52, into a drain line 60, and thereby regulate a second line pressure Pl2 in the second pressure line 52, so that the second line pressure Pl2 is lower than the first line pressure Pl1. The first and second pressure regulating valves 48, 58 are each constituted by a so-called solenoid-operated proportional relief valve. The shift-control valve 44 has a first drain port 54 through which the fluid is discharged through a relief line 59 into the oil reservoir 38, so that the lower limit of a pressure range of the fluid discharged from one of the first and second cylinders 26, 28 is substantially equal to the atmospheric pressure.

The shift-control valve 44 is a so-called solenoid-operated proportional control valve, which includes a valve body 65 having: the input port 46; the first and second drain ports 54, 56; a first output port 62 connected to the first cylinder 26 via a conduit 29; a second output port 64 connected to the second cylinder 28 via a conduit 30; and a cylinder bore 66 which communicates with all of these ports 46, 54, 56, 62 and 64. The shift-control valve 44 further includes: a valve spool 68 slidably received in the cylinder bore 66; a first spring 70 and a second spring 72 which are disposed at opposite ends of the valve spool 68, to bias the spool 68 in opposite directions toward a neutral position of the spool 68, thus holding the spool 68 in its neutral position; and a first and a second solenoid 74, 76 which are disposed at the opposite ends of the valve spool 68, to move the spool 68 against the biasing action of the second or first spring 72, 70. The valve spool 68 has formed thereon four lands 78, 80, 82 and 84, which are disposed in the order of description from the end of the spool on the side of the first spring 70. The two intermediate lands 80, 82 are formed such that the lands 80, 82 are aligned with the first and second output ports 62, 64, respectively, in the longitudinal direction of the spool 68, when the spool 68 is placed in its neutral position. The inner surface of the cylinder bore 66 is formed with a first and a second annular groove 62, 64 which are opposite to the intermediate lands 80, 82, respectively, when the spool 68 is placed in its neutral position. In other words, the first and second annular grooves 86, 88 are formed in the spaced-apart portions of the inner surface of the cylinder bore 66, in which the first and second output ports 62, 64 are open. The first and second annular grooves 86, 88 have a width larger than that of the first and second output ports 62, 64, and cooperate with the intermediate lands 80, 82 to form variable flow restrictors which have a continuously variable area of flow of the fluid therethrough.

While the valve spool 68 is placed in the neutral position, the first and second output ports 62, 64 are held in communication with the input port 46, and with the first and second drain ports 54, 56, with a relatively small equal area of communication. Namely, the first and second hydraulic cylinders 26, 28 are supplied with small flows of the fluid from the first and second output ports 62, 64, in orer to compensate for leakage flows of the fluid from the cylinders 26, 28. At the same time, small flows of the fluid are discharged from the first and second drain ports 54, 56.

As the valve spool 68 is moved from its neutral position in one of the longitudinal directions, for example, toward the second solenoid 76 (in the right direction as viewed in FIG. 1), the area of communication between the first output port 62 and the first drain port 54 continuously increases, while the area of communication between the second output port 64 and the input port 46 continuously increases. Consequently, the pressure of the fluid to be applied from the first output port 62 to the first cylinder 26 is made lower than that of the fluid to be applied from the second output port 64 to the second cylinder 28. As a result, the equilibrium in the thrust between the first and second cylinders 26, 28 of the transmission 14 is gradually lost, whereby the fluid from the second output port 64 flows into the second cylinder 28, whereas the fluid in the first cylinder 26 is discharged. Thus, the speed ratio e of the transmission 14 (e=Nout/Nin, where Nout: speed of the second shaft 18, Nin: speed of the first shaft 16) is decreased.

Conversely, as the valve spool 68 is moved from the neutral position toward the first solenoid 74 (in the left direction in FIG. 1), the area of communication between the first output port 62 and the input port 46 increases, while the area of communication between the second output port 64 and the second drain port 56 increases. Consequently, the pressure of the fluid to be applied from the first output port 62 to the first cylinder 26 is made higher than that of the fluid to be applied from the second output port 64 to the second cylinder 28. Consequently, the equilibrium in the thrust between the two cylinders 26, 28 is gradually lost, and the fluid is discharged from the second cylinder 28, whereas the fluid flows into the first cylinder 26. As a result, the speed ratio e of the transmission 14 is increased. As described above, the shift-control valve 44 has not only a function of a directional control valve capable of applying a relatively high fluid pressure to one of the cylinders 26, 28 and a relatively low fluid pressure to the other cylinder (i.e., for changing the directions of flow of the fluid to and from the cylinders), but also a function of a flow control valve capable of continuously adjusting rates of flow of the fluid to and from the cylinders 26, 28.

The continuously variable transmission 14 has a first speed sensor 90 for detecting the rotating speed Nin of the first shaft 16, and a second speed sensor 92 for detecting the rotating speed Nout of the second shaft 18. The first and second speed sensors 90, 92 produce first and second ROTATION signals SR1 and SR2 indicative of the rotating speeds Nin and Nout, respectively, which signals SR1 and SR2 are applied to a controller 94. Further, the engine 10 is provided with a throttle sensor 96 for sensing a current throttle position $\theta$th of a throttle valve disposed in an intake manifold, and also with the engine-speed sensor 98 for sensing a current speed Ne of the engine 10. The throttle sensor 96 produces a THROTTLE signal SE indicative of the current throttle position $\theta$th, and the engine-speed sensor 98 produces an ENGINE SPEED signal SE indicative of the current engine speed Ne. These signals are also applied to the controller 94.

The controller 94 indicated above, which serves as control means for the hydraulic control system for the transmission 14, is constituted by a so-called microcomputer which includes a CPU 102 (central processing unit), a ROM 104 (read-only memory), a RAM 106 (random-access memory). The CPU 102 is adapted to process various input signals according to control programs stored in the ROM 104, while utilizing a temporary data storage function of the RAM 106. According to the processed input signals, the CPU 102 applies to the first and second pressure regulating valves 48, 58 the first and second VALVE DRIVE signals VD1 and VD2, for regulating the pressures in the first and second pressure lines 50, 52. Further, the CPU 102 feeds to the first and second solenoids 74, 76 first and second SPEED RATIO signals RA1 and RA2 for controlling the speed ratio e of the transmission 14.

Figure 2:
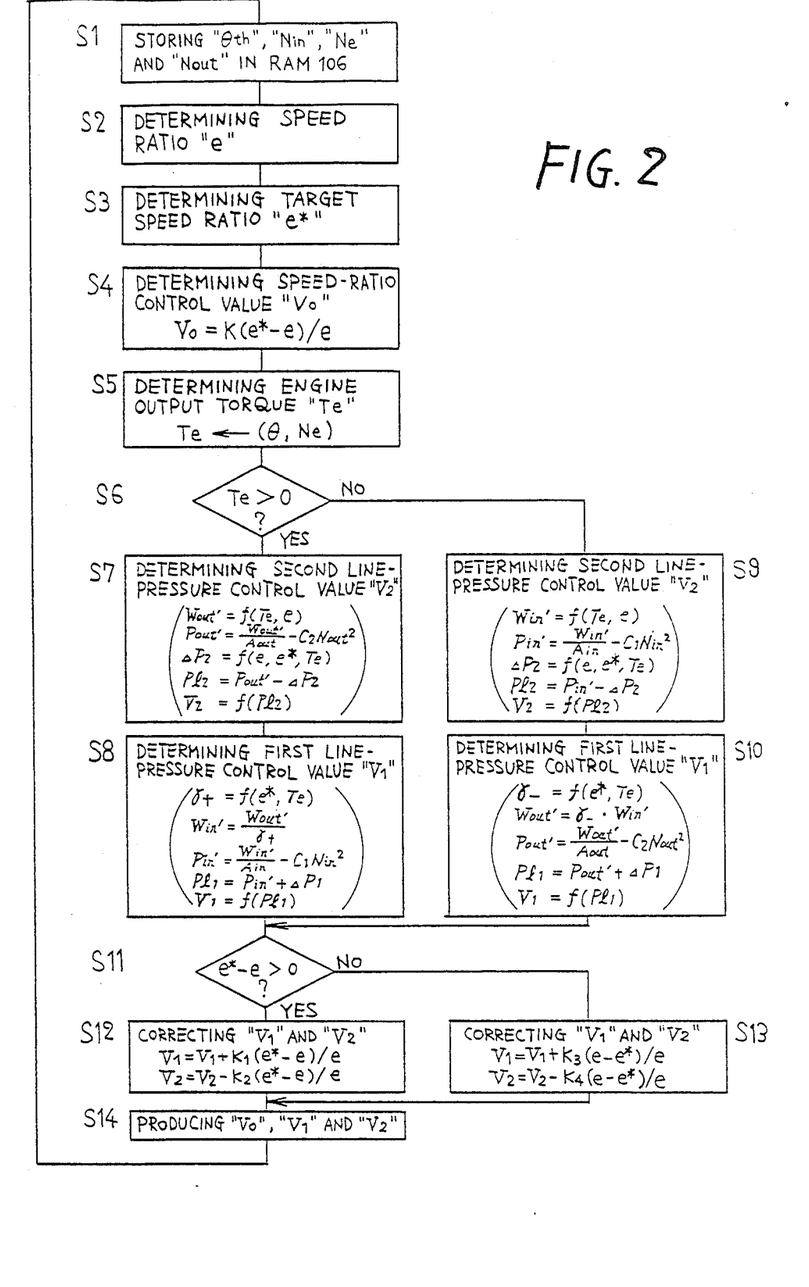
FIG. 2 is a flow chart illustrating an operation of the embodiment of FIG. 1.

Referring next to the flow chart of FIG. 2, the operation of the present hydraulic control system for the transmission 14 will be described.

Initially, the CPU 102 executes step S1, wherein the rotating speed Nin of the first shaft 16, the rotating speed Nout of the second shaft 18, the throttle position $\theta$th, and the engine speed Ne are read and stored into the RAM 106, according to the first and second ROTATION signals SR1, SR2, the THROTTLE SIGNAL S$\theta$, and the ENGINE SPEED signal SE. Then, the CPU 102 goes to step S2 in which the speed ratio e is calculated based on the stored speeds Nin and Nout, according to the following equation (1) stored in the ROM 104:

$$e = Nout/Nin \ldots \tag{1}$$

Figure 3:
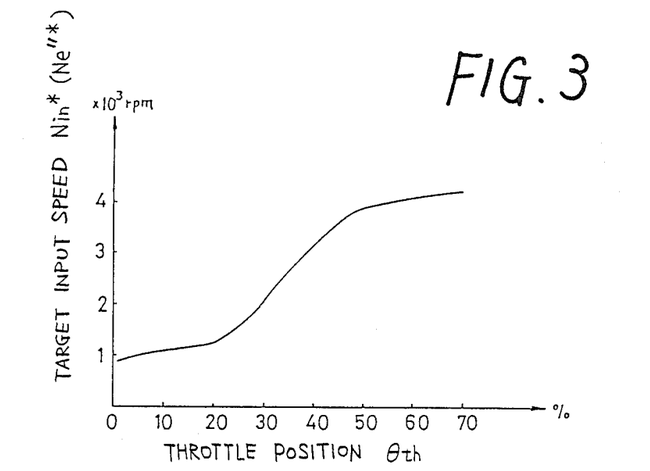
FIG. 3 is a view showing a relationship used in the operation illustrated in FIG. 2.
Figure 4:
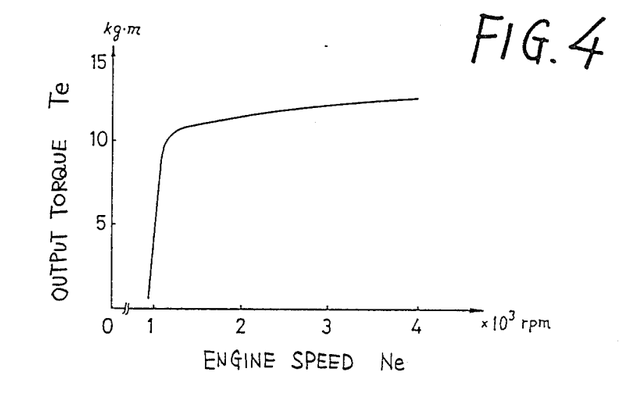
FIG. 4 is a view showing a speed-output torque curve for minimum fuel consumption by an engine.

Step S2 is followed by step S3 wherein a desired or target input speed Nin* of the first shaft 16 is determined based on the stored throttle position $\theta$th and other variables, according to a predetermined relation stored in the ROM 104. Based on the determined target input speed Nin* and the stored speed Nout, a target speed ratio e* is determined according to the above equation (1). The relation for determining the target input speed Nin* is shown in FIG. 3, by way of example only. This relation is predetermined so as to operate the engine 10 with a minimum fuel consumption, according to the torque-speed curve indicated in FIG. 4. In the following step S4, a speed-ratio control value Vo is determined according to the following equation (2) stored in the ROM 104:

$$Vo = k(e^* - e)/e \ldots \tag{2}$$

where, k: control constant

In step S14 which will be described, if the determined speed-ratio control value Vo is positive, the CPU 102 produces the second SPEED-RATIO signal RA2 so that the valve spool 68 is moved in the left direction, to increase the rotating speed Nout of the second shaft 18. If the determined value Vo is negative, the CPU 102 produces in step S14 the first SPEED-RATIO signal RA1 so that the valve spool 68 is moved in the right direction, to increase the rotating speed Nin of the first shaft 16. The speed-ratio control value Vo is proportional to the magnitude of the SPEED-RATIO signal RA1 or RA2, and therefore to the amount of movement of the valve spool 68. As is apparent from the equation (2), therefore, the speed-ratio control value Vo is determined so that the actual speed ratio e coincides with the determined target speed ratio e*.

Figure 5:
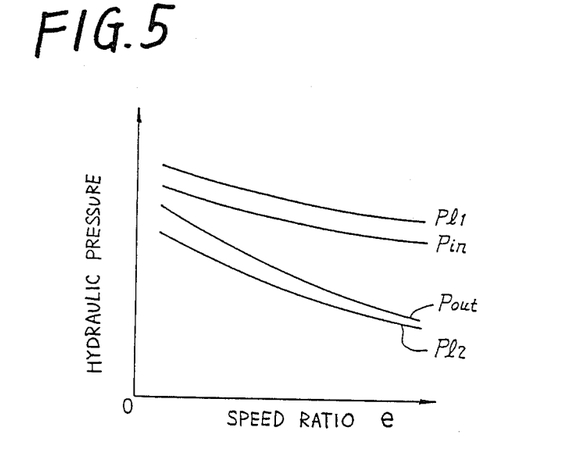
FIGS. 5 and 6 are views representing changes in hydraulic pressures in the hydraulic control system, in relation to the speed ratio of the continuously variable transmission, FIG. 5 showing the changes while the engine is producing a positive torque, and FIG. 6 showing the changes while the engine is providing a braking effect.
Figure 6:
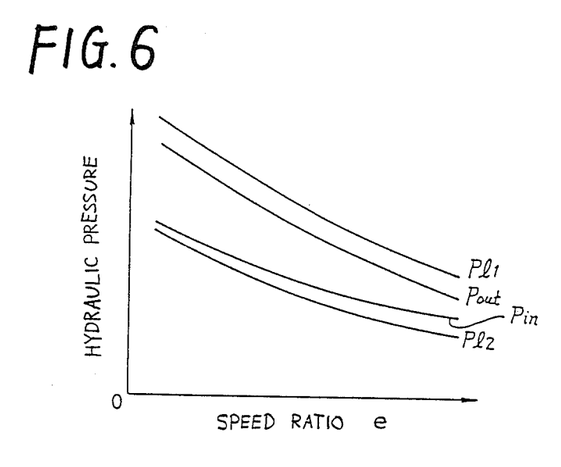

In step S5, an actual output torque Te of the engine 10 is determined based on the throttle position $\theta$th and the engine speed Ne, according to a well known relationship stored in the ROM 104. In the next step S6, the CPU 102 checks to see if the output torque Te of the engine 10 is positive or not, namely, to see if the engine 10 is placed in a positive-torque condition providing a positive torque, or in an engine-brake condition providing a braking effect to the vehicle. This judgment is necessary because the pressure changing characteristics of the hydraulic cylinders 26, 28 in relation to the speed ratio e differ depending upon the direction of power transmission, that is, depending upon whether the engine 10 is in the positive-torque condition or the engine-brake condition. Described more specifically, FIGS. 5 and 6 show changes in pressures Pin and Pout in the first and second cylinders 26, 28, in relation to the speed ratio e of the transmission 14, when the engine 10 is placed in the positive-torque and engine-brake conditions, respectively. As indicated in these figures, the magnitudes of the pressures Pin and Pout are reversed when the engine 10 is switched from the positive-torque condition to the engine-brake condition, or vice versa. Namely, the pressure in one of the cylinders 26, 28 which is provided on the drive shaft (16 in the positive-torque condition, or 18 in the engine-brake condition), is higher than the pressure in the other cylinder provided on the driven shaft. Although this phenomenon should be discussed in terms of the magnitudes of the thrust forces produced by the first and second cylinders 26, 28, the phenomenon has been discussed in terms of the pressures of the fluid in the two cylinders 26, 28, since the two cylinders have the same pressure-receiving areas.

If the checking in step S6 reveals that the output torque T3 is positive, step S6 is followed by step S7 in which a second line-pressure control value V2 is determined so as to obtain a pressure (target pressure) Pout' of the second cylinder 28 necessary to establish a required minimum tension of the transmission belt 24. More specifically, an optimum thrust Wout' (calculated value) of the second cylinder 28 is first obtained based on the actual output torque Te of the engine 10 and the actual speed ratio e of the transmission 14, according to the following equation (3) stored in the ROM 104. Further, the pressure Pout' (calculated value) is obtained based on the determined thrust Wout' and pressure-receiving area Aout of the second cylinder 28, and on the rotating speed Nout of the second shaft 28, according to the following equation (4) stored in the ROM 104. Then, a pressure compensation value ΔP2 is calculated based on the actual speed ratio e, the target speed ratio e*, and the actual engine output torque Te, according to the following equation (5) stored in the ROM 104. Subsequently, the second line pressure Pl2 is calculated based on the predetermined pressure Pout' and the pressure compensation value ΔP2 according to the following equation (6), and the second line-pressure control value V2 is determined so as to obtain the calculated second line pressure Pl2, according to the following equation (7).

$$Wout' = f(Te, e) \quad (3)$$

$$Pout' = \frac{Wout'}{Aout} - C2\ Nout^2 \quad (4)$$

$$\Delta P2 = f(e, e^*, Te) \quad (5)$$

$$Pl2 = Pout' - \Delta P2 \quad (6)$$

$$V2 = f(Pl2) \quad (7)$$

The equation (3) is predetermined so as to establish the required minimum tension of the transmission belt 24, i.e., a required minimum force acting on the belt 24. The thrust Wout' is increased in proportion to a quotient of the output torque Te divided by the speed ratio e, i.e., Te/e. The second term of the equation (4) is a centrifugal pressure which increases with the speed Nout, and which is subtracted from the first term of the equation to correct the pressure Pout'. A value C2 in the second term is a centrifugal-force compensating constant which is predetermined by the specifications of the second cylinder 28, and the specific gravity of the working fluid used.

Figure 7:
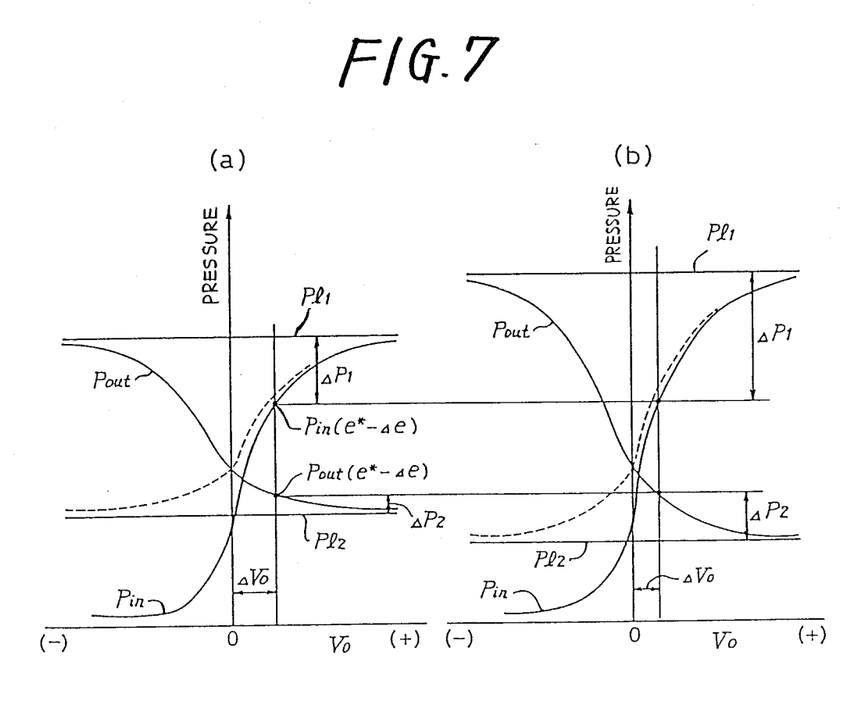
FIGS. 7(a) and 7(b) are views showing output characteristics of a shift-control valve used in the hydraulic control system of FIG. 1, FIG. 7(a) showing the characteristics while a difference between first and second lines pressures is comparatively small, while FIG. 7(b) showing the characteristics while the difference is relatively large.

The equation (5) is predetermined so as to calculate the compensation value ΔP2. More specifically, FIGS. 7(a) and 7(b) show changes in the pressures Pin and Pout in the first and second cylinders 26, 28, in relation to the speed-ratio control value Vo (which is the position of the spool 68 of the shift-control valve 44), at different levels of the first and second line pressures Pl1, Pl2. Suppose the thrusts of the two cylinders 26, 28 are in equilibrium at the speed-ratio control value of ΔVo, the prssure Pout in the second cylinder 28 is higher by an amout of ΔP2 than the second line pressure Pl2. Therefore, the second line pressure Pl2 to be controlled is obtained by subtracting the pressure compensation value ΔP2 obtained from the equation (5), from the pressure Pout' obtained from the equation (4). This compensation value ΔP2 is determined by the pressure changing characteristics of the shift-control valve 44, the speed-ratio control value Vo, and a difference between the first and second line pressures (Pl1−Pl2). Since the speed-ratio control value Vo is determined based on a difference (e*−e), and the pressure difference (Pl1−Pl2) is determined based on the actual output torque Te and the actual speed ratio e, the compensation value ΔP2 is determined as a function of the actual speed ratio e, target speed ratio e* and actual output torque Te. Thus, the equation (5) is predetermined as indicated. If the pressure changing characteristics of the shift-control valve 44 is such that the pressure compensation value ΔP2 is relatively small over the entire range of operation, a predetermined constant value may be used as the compensation value ΔP2.

The equation (7) is provided in the form of a stored data map predetermined so as to determine the second line-pressure control value V2 for obtaining the calculated second line pressure Pl2, taking the operating characteristics of the second pressure regulating valve 58 into consideration.

In the next step S8, the first line-pressure control value V1 is determined so as to obtain the pressure Pin' (target pressure) of the first cylinder 26 necessary to provide a required minimum thrust for establishing the target speed ratio e*. Described more specifically, a thrust ratio γ+ of the two cylinders 26, 28 (Wout of the cylinder 28/Win of the cylinder 26) in the positive-torque condition of the engine 10 is first calculated based on the target speed ratio e* and the actual output torque T3 of the engine 10, according to the following equation (8). Then, a thrust Win' of the first cylinder 26 is obtained based on the calculated thrust ratio γ+ and the calculated thrust Wout' of the second cylinder 28, according to the following equation (9). Further, a pressure Pin' (calculated value) is obtained based on the calculated thrust Win' and the pressure-receiving area Ain of the first cylinder 26, and the rotating speed Nin of the first shaft 16, according to the following equation (10). Then, the first line pressure Pl1 is calculated based on the calculated pressure Pin' and pressure compensation value ΔP1, according to the following equation (11), and the first line-pressure control value V1 is determined based on the calculated first line pressure Pl1, according to the following equation (12).

$$\gamma+ = f(e^*, Te) \quad (8)$$

$$Win' = \frac{Wout'}{\gamma+} \quad (9)$$

$$Pin' = \frac{Win'}{Ain} - C1\ Nin^2 \quad (10)$$

$$Pl1 = Pin' + \Delta P1 \quad (11)$$

$$V1 = f(Pl1) \quad (12)$$

The equation (8) is a relationship predetermined so as to obtain the required thrust ratio γ+ of the two cylinders 26, 28 in relation to the target speed ratio e* and actual output torque Te, in order to control the first line pressure for providing an optimum shifting response of the transmission 14 over the entire range of operation. The second term of the equation (10) is a centrifugal pressure which increases with the speed Nin, which is subtracted from the first term of the equation. A value C1 is a constant determined by the specifications of the first cylinder 26 and the specific gravity of the working fluid. The equation (11) is provided to determine the first line pressure Pl1 by adding the pressure compensation value ΔP1 to the pressure Pin' calculated from the equation (10). This compensation value ΔP1 is determined so as to provide an optimum compromise between a power loss of the hydraulic system and a control error $\Delta e$ (corresponding to $\Delta Vo$) of the speed ratio e, which power loss and the error are incompatible with each other. Described in greater detail, FIG. 7(a) shows a case where the compensation value $\Delta P1$ is relatively small, while FIG. 7(b) shows a case where the compensation value $\Delta P1$ is relatively large. In the case of FIG. 7(a), the control error e $\Delta$ is comparatively large. In the case of FIG. 7(b), the control error e is comparatively small, since the pressures Pin and Pout in the first and second cylinders 26, 28 are rapidly or suddenly changed. However, as the compensation value $\Delta P1$ is increased, the power loss of the hydraulic system is increased since the first line pressure Pl1 is increasingly likely to be raised to an unnecessarily high level for some operating conditions of the transmission 14.

The equation (12) is provided in the form of a stored data map predetermined to determine the first line-pressure control value V1, for obtaining the calculated first line pressure Pl1, taking the operating characteristics of the first pressure regulating valve 48 into consideration.

If the checking in step S6 reveals that the determined output torque Te of the engine 10 is equal to zero or negative, that is, the engine 10 is in the engine-brake condition, with power being transmitted from the vehicle wheels to the engine, step S6 is followed by steps S9 and S10 similar to steps S7 and S8. In these steps S9 and S10, the second and first line-pressure control values V2 and V1 are determined based on the pressures Pin' and Pout' required for the first and second cylinders 26, 28, respectively. More specifically, step S9 is executed to: determine the optimum thrust Win' of the first cylinder 26 based on the determined torque Te and speed ratio e, according to the following equation (13); calculate the pressure Pin' to be applied to the first cylinder 26, according to the following equation (14); obtain the pressure compensation value $\Delta P2$ according to the previously indicated equation (5); calculate the second line pressure Pl2 based on the calculated Pin' and compensation value $\Delta P1$, according to the following equation (15); and determine the second line-pressure control value V2 according to the previously indicated equation (7). The next step S10 is executed to: calculate a thrust ratio $\gamma$- of the two cylinders 26, 28 based on the target speed ratio e* and output torque Te, according to the following equation (16); obtain the thrust Wout' of the second cylinder 28 based on the calculated thrust ratio $\gamma$- and thrust Win' of the first cylinder 26, according to the following equation (17); calculate the pressure Pout' in the second cylinder 28 according to the following equation (18); determine the first line pressure Pl1 based on the calculated pressure Pout' and compensation value $\Delta P1$, according to the following equation (19); and determine the first line-pressure control value V1 for obtaining the determined first line pressure Pl1, according to the previously indicated equation (12).

$$Win' = f(Te, e) \qquad (13)$$

$$Pin' = \frac{Win'}{Ain} - C1\,Nin^2 \qquad (14)$$

$$Pl2 = Pin' - \Delta P2 \qquad (15)$$

$$\gamma- = f(e^*, Te) \qquad (16)$$

$$Wout' = \gamma \cdot Win' \qquad (17)$$

$$Pout' = \frac{Wout'}{Aout} - C2\,Nout^2 \qquad (18)$$

$$Pl1 = Pout' + \Delta P1 \qquad (19)$$

After steps S9 and S10 have been executed as described above to determine the second and first line-pressure control values V2 and V1, the next step S11 is executed to check if an error $\Delta e$ of the actual speed ratio e with respect to the target speed ratio e* is positive or not. If the error $\Delta e$ is positive, step S11 is followed by step S12 wherein the first and second line-pressure control values V1 and V2 are corrected according to the following equations (20) and (21), respectively. If the error $\Delta e$ is equal to zero or negative, step S11 is followed by step S13 in which the first and second line-pressure control values V1 and V2 are corrected according to the following equations (22) and (23), respectively.

$$V1 = V1 + k1(e^* - e)/e \ldots \qquad (20)$$

$$V2 = V2 - k2(e^* - e)/e \ldots \qquad (21)$$

$$V1 = V1 + k3(e - e^*)/e \ldots \qquad (22)$$

$$V2 = V2 - k4(e - e^*)/e \ldots \qquad (23)$$

where, K1, K2, K3, K4: constants

As is apparent from the above equations, steps S12 and S13 are executed to determine the control values V1 and V2 so that the rate of change in the speed ratio e of the transmission 14 is increased by increasing the difference between the first and second line pressuers Pl1 and Pl2, as the absolute value of the error $\Delta e$ increases. In the positive-torque condition, for example, the first line pressure Pl1 is higher by the compensation value $\Delta P1$ than the pressure Pin in the first cylinder 26 (Pin in the cylinder 26 being higher than Pout in the cylinder 28, while the engine 10 is in the positive-torque condition). It is noted that the first line pressure cannot be raised so high, from the standpoint of reducing the power loss of the hydraulic system, and therefore the speed ratio e cannot be changed at a sufficiently high rate. According to the present invention, however, the difference between the first and second line pressures Pl1 and Pl2 is increased with the absolute value of the error $\Delta e$. Namely, while the difference between the actual speed ratio e and the target speed ratio e* is relatively large, the difference between the first and second line pressures Pl1 and Pl2 is made relatively large, so that the actual speed ratio e can be changed at an accordingly high rate, i.e., the transmission 14 can be shifted with an improved response.

The constants k1, k2, k3 and k4 used in the equations (20), (21), (22) and (23) affect the shifting response of the transmission 14. In this embodiment, k1 is smaller than k3, while k2 is smaller than k4, since a fast shift-down and a slow shift-up of the transmission 14 generally gives the vehicle driver a better drive feel.

In step S14, which is the last step of the series of steps of a control cycle, the sigansl RA1, RA2, VD1, VD2 are produced according to the speed-ratio control value Vo and the first and second line-pressure control values V1 and V2 which have been determined in the previous steps. As a result, the speed ratio e, and the first and second line pressures Pl1 and Pl2 are controlled, as indicated in FIGS. 5, 6, 7(a) and 7(b).

As described above, the present hydraulic control system is adapted to control the first and second line pressures Pl1 and Pl2, by means of the first and second pressure regulating valves 48, 58, respectively. Therefore, the flow rate of the fluid to be fed into one of the two cylinders 26, 28, and the flow rate of the fluid to be discharged from the other cylinder, can be determined by a difference between the first and second line pressures Pl1 and Pl2. In other words, the rate at which the continuously variable transmission 14 is shifted up and down is not affected by the current speed ratio e and the transmission torque (output torque Te), but is solely determined by the line pressure difference between Pl1 and Pl2. Hence, the transmission 14 controlled by the instant hydraulic control system can be shifted at a relatively high speed, i.e., provides a fast response to the required change in the speed ratio.

Further, the first line pressure Pl1 is controlled by controlling the first pressure regulating valve 48 is relation to the output torque Te of the engine 10 or the second line pressure Pl2, and the actual speed ratio e, so as to minimize the power loss of the hydraulic system, but so that the transmission 14 can be shifted at a sufficiently high rate. Furthermore, the second line pressure Pl2 is controlled by controlling the second pressure regulating valve 58 in relation to the speed ratio e and transmission torque, so as to minimize the power loss, but to permit the transmission 14 to operate without a slip of the belt 24. Thus, the instant hydraulic control system is advantageously adapted for considerable reduction in the power loss of the vehicle engine due to unnecessarily high hydraulic pressures used for the transmission 14.

In the illustrated embodiment, the relief line 59 connected to the shift-control valve 44 for discharging the fluid from the first cylinder 26 is exposed to a substantially atmospheric pressure. Therefore, the pressure Pin in the first cylinder 26 can be changed between the first line pressure Pl1 and the atmospheric pressure, as shown in FIGS. 7(a) and 7(b). That is, the present arrangement permits the pressure Pin to be changed over a wider range, as compared with an arrangement wherein the first drain port 56, as well as the second drain port 54, is exposed to the second line pressure Pl2, as indicated in dashed line in FIGS. 7(a) and (b). According to the illustrated hydraulic control system, therefore, the fluid in the first cylinder 26 can be discharged at a higher rate. This indicates an increased speed at which the transmission 14 is shifted in a direction to reduce its speed ratio e. Thus, the shift-down response of the transmission 14, and the drivability of the vehicle are enhanced. The present arrangement overcomes an otherwise possible slow response of the transmission when it is desired to accelerate the vehicle after a sudden stop.

Other embodiments of the present invention will be described. The same reference numerals as used in the preceding embodiment will be used in these other embodiments to identify the functionally corresponding elements, and no redundant description of these elements will be provided.

Figure 8:
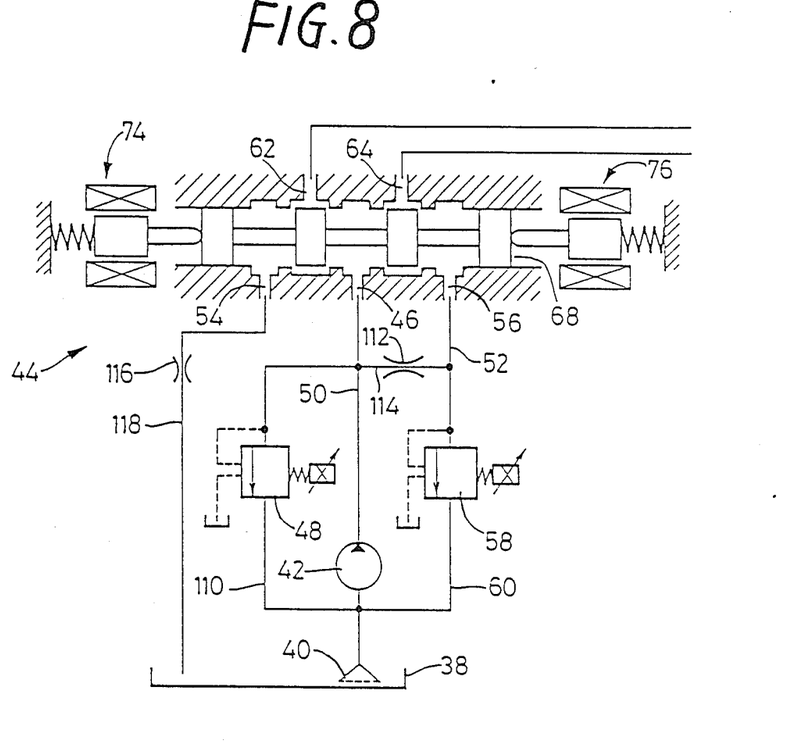
FIGS. 8 and 9 are schematic fragmentary views illustrating other embodiments of the present invention.

There is shown in FIG. 8 a hydraulic control system for the belt-and-pulley type continuously variable transmission 14, wherein the first and second pressure regulating valves 48, 58 are disposed at different positions in the hydraulic circuit, than those used in the preceding embodiment. Described in more detail, the first pressure regulating valve 48 is disposed so that the fluid in the first pressure line 50 may be released through the valve 48 direcly to the suction side of the oil pump 42 through a drain line 110. The fluid delivered from the oil pump 42 through the first pressure line 50 is also fed to the second pressure line 52 through a line 114 in which a flow restrictor 112 is provided. This line 114 provides a flow of the fluid necessary to enable the second regulating valve 58 to function for controlling the second line pressure Pl2, and to assure a difference between the first and second line pressures Pl1 and Pl2. In other words, the second pressure regulating vale 58 operates to regulate the pressure of the fluid supplied through the line 114, and the pressure of the fluid discharged through the second drain port 56 of the shift-control valve 44. In the present embodiment, too, the fluid discharged from the first drain port 54 of the shift-control valve 44 is returned through a relief line 118 to the oil reservoir 38 which is open to the atmosphere. The relief line 118 has a flow restrictor 116. In this arrangement, the pressure Pin in the first cylinder 26 may be lowered down substantially to the atmospheric pressure.

Like the preceding embodiment, the present embodiment is adapted to regulate the first and second line pressures Pl1 and Pl2 to the required minimum levels, providing the same advantages as previously described. In the present embodiment, the flow restrictor 116 provided in the relief line 118 provides a flow resistance to the fluid discharged from the first cylinder 26. As a result, the first cylinder 26 is given a back pressure, limiting the maximum rate at which the speed ratio e is changed in a direction to lower the vehicle speed (maximum rate of decrease in the speed ratio (e). That is, the flow restrictor 116 determines an optimum upper limit of the shift-down speed of the transmission 14.

Figure 9:
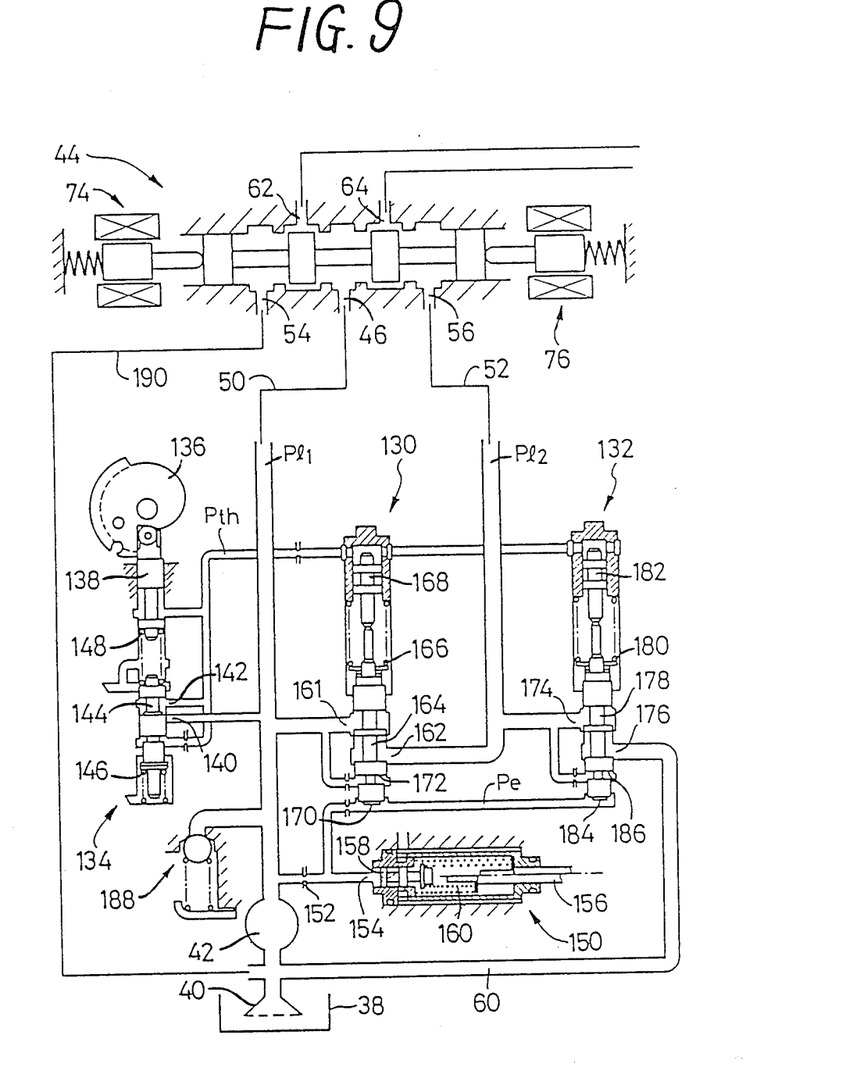

Referring next to FIG. 9, there is shown another hydraulic control system wherein hydraulically controlled first and second pressure regulating valves 130, 132 are used, in place of the pressure regulating valves 48, 58 which are solenoid-operated proportional relief valves.

Described in greater detail, the hydraulic control system includes a throttle-position sensing valve 134 for sensing the operating position of a throttle valve (not shown). This sensing valve 134 includes: a plunger 138 axially moved by a cam 136 which rotates with the throttle valve; a valve spool 144 operable to connect or disconnect an input port 140 and an output port 142; a spring 146 for biasing the spool 144 in a direction to disconnect the input and output ports 140, 142; and a spring 148 disposed between the plunger 138 and the spool 144, for biasing the spool 144 in a direction to effect communication between the input and output ports 140, 142. The biasing force of the spring 148 is varied with the throttle position of the throttle valve. In operation, the valve spool 144 is moved to a position at which the biasing force of the spring 148 in the direction to open the valve is equal to a sum of the biasing force of the spring 146 in the direction to close the valve, and a thrust force produced by a feedback pressure (Pth), which acts to close the valve. The throttle-position sensing valve 134 having the thus operated spool 144 produces from the output port 142 a throttle pressure Pth which increases with the throttle valve opening. The throttle pressure Pth is applied to the first and second pressure regulating valves 130, 132.

The hydraulic control system further includes a speed-ratio sensing valve 150 which includes: a port 154 connected to the first pressure line 50 through a flow restrictor 152; a rod 156 which is axially moved in sliding contact with the movable rotor 34 or 36 of the transmission 14; a valve spool 158 which is axially movable to change the area of communication between the port 154 and a drain port 155; a spring 160 disposed between the spool 158 and the rod 156, for biasing the spool 158 with a biasing force which varies with a change in the position of the rod 156, thereby changing the flow of the fluid from the port 154 to the drain port 155. The sensing valve 150 applies to the first and second pressure regulating valves 130, 132 a speed-ratio pressure Pe which increases with an increase in the speed ratio of the transmission 14. The upper and lower halves of the speed-ratio sensing valve 150 above and below its centerline as shown in FIG. 9, correspond to two different positions of the rod 156.

The first pressure regulating valve 130 is disposed between the first pressure line 50 and the second pressure line 52, and functions to regulate the first line pressure Pl1 by releasing a portion of the fluid from the first pressure line 50 to the second pressure line 52. The valve 130 includes: a valve spool 164 operable to control communication between an input port 161 and an output port 162, which communicate with the first and second pressure lines 50, 52, respectively; a spring 166 for biasing the spool 164 in a direction to disconnect the input and output ports 161, 162 from each other (to close the valve); and a plunger 168 which receives the previously indicated throttle pressure Pth, and transmits the received pressure Pth to the spool 164 in the direction to close the valve. The valve spool 164 has a pair of pressure-receiving surfaces 170, 172 which receive the speed-ratio pressure Pe and the first line pressure Pl1. The spool 164 is moved to a position at which a thrust force to close the valve 130 based on the speed-ratio pressure Pe and the first line pressure Pl1 acting on the pressure-receiving surfaces 170, 172 is equal to a thrust force to open the valve 130 based on the biasing force of the spring 166 and the throttle pressure Pth transmitted from the plunger 168. In this arrangement, the first line pressure Pl1 is lowered with an increase in the speed-ratio pressure Pe, and is raised with an increase in the throttle pressure Pth. Thus, the first line pressure Pl1 is controlled based on a currently required output of the vehicle expressed in the form of the current position of the throttle valve, and on the actual speed ratio e of the continuously variable transmission 14, so that the first line pressure Pl1 is held at a minimum level necessary to provide a sufficient thrust force for establishing the determined target speed ratio e* of the transmission 14. The areas of the pressure-receiving surfaces 170, 172, the biasing force of the spring 166 and the pressure-receiving area of the plunger 168, are determined so as to control the first line pressure Pl1 as described above.

The second pressure regulating valve 132 is disposed between the second pressure line 52 and the drain line 60, for regulating the second line pressure Pl2 by releasing a portion of the fluid from the second pressure line 52 to the dain line 60. The second pressure regulating valve 132 includes: a valve spool 178 operable to control communication between an input port 174 and an output port 176, which communicate with the second pressure line 52 and the drain line 60, respectively; a spring 180 for biasing the spool 178 in a direction to disconnect the input and output ports 174, 176 from each other (to close the valve); and a plunger 182 which receives the throttle pressure Pth, and transmits the received pressure Pth to the spool 178 in the direction to close the valve. The valve spool 178 has a pair of pressure-receiving surfaces 184, 186 which receive the speed-ratio pressure Pe and the second line pressure Pl2. The spool 178 is moved to a position at which a thrust force to close the valve 132 based on the speed-ratio pressure Pe and the second line pressure Pl2 acting on the pressure-receiving surfaces 184, 186 is equal to a thrust force to open the valve 132 based on the biasing force of the spring 180 and the throttle pressure Pth transmitted from the plunger 182. In this arrangement, the second line pressure Pl2 is lowered with an increase in the speed-ratio pressure Pe, and is raised with an increase in the throttle pressure Pth. Thus, the second line pressure Pl2 is controlled based on the currently required output of the vehicle (current position of the throttle valve), and on the actual speed ratio e of the transmission 14, so that the second line pressure Pl2 is held at a minimum level necessary to provide a sufficient thrust for establishing a tension of the transmission belt 24 that prevents a slip of the belt on the pulleys 20, 22. The areas of the pressure-receiving surfaces 184, 186, the biasing force of the spring 180 and the pressure-receiving area of the plunger 182, are determined so as to control the second line pressure Pl2 as described above.

In this embodiment, too, the first drain port 54 of the shift-control valve 44 is connected through a relief line 190 to the suction line of the oil pump 42 which is exposed to a substantially atmospheric pressure. Reference numeral 188 designates a relief valve.

According to the modified embodiment as described above, the shift-control valve 44 is controlled by the controller 94, so that the actual speed ratio e coincides with the determined target speed ratio e*. Further, the first and second pressure regulating valves 130 and 132 are hydraulically controlled, so as to control the first and second line pressure Pl1 and Pl2, so that the first line prsesure Pl1 permits a fast change of the actual speed ratio e to the target speed ratio e*, and the second line pressure Pl2 assures a slip-free tension of the transmission belt 24. Since the fluid from the first drain port 54 of the shift-control valve 44 is discharged through the relief line 190 to the suction side of the oil pump 42 which is substantially under the atmospheric pressure, the advantages as previously described in connection with the relief line 59 are offered also in this embodiment.

While the present invention has been described in its preferred embodiments, it is to be understood that the invention may be otherwise embodied.

In the first embodiment, the first drain port 54 is exposed substantially to the atmospheric pressure while the second drain port 56 is connected to the second pressure line. However, the first drain port 54 may be connected to the second pressure line while the second drain port 56 is exposed substantially to the atmospheric pressure. This arrangement permits a relatively high rate of increase in the speed ratio, i.e., a fast response when the transmission is shifted up in a direction to accelerate the vehicle.

It is to be further understood that the invention is not limited to the details of the illustrated embodiments, but various changes and modifications may be made in the invention, without departing from the spirit and scope of the invention defined in the following claims.

What is claimed is:

1. A hydraulic control system for a continuously variable transmission of a belt-and-pulley type for an automotive vehicle, the transmission having a first and a second shaft, a first and a second variable-diameter pulley provided on the first and second shafts, respectively, a transmission belt connecting the first and second pulleys to transmit power from one of the pulleys to the other, and a first and a second hydraulic cylinder for changing effective diameters of the first and second pulleys, said hydraulic control system comprising:

- a hydraulic pressure source for pressurizing a working fluid;
- a first pressure regulating valve for regulating the pressure of the pressurized fluid delivered from said hydraulic pressure source, and thereby establishing a first line pressure;
- a shift-control valve for applying said first line pressure to one of said first and second hydraulic cylinders, while simultaneously permitting a flow of the fluid from the other hydraulic cylinder, thereby changing the effective diameters of said first and second pulleys to control a speed ratio of said transmission;
- a second pressure regulating valve for regulating the pressure of one of a first and a second discharge flow of the fluid from the respective first and second hydraulic cylinders through said shift-control valve, and thereby establishing a second line pressure which is lower than said first line pressure; and
- a relief line for releasing the other of said first and second discharge flows of the fluid from said respective first and second hydraulic cylinders, said relief line being exposed to a substantially atmospheric pressure.

2. A hydraulic control system according to claim 1, wherein said second pressure regulating valve regulates the pressure of said second discharge flow of the fluid from said second hydraulic cylinder, while said relief line releases said first discharge flow of the fluid from said first hydraulic cylinder, under said substantially atmospheric pressure, said first shaft being connected to an engine of said vehicle.

3. A hydraulic control system according to claim 1, wherein said hydraulic pressure source comprises an oil pump, and said relief line is connected to a suction line connected to said oil pump.

4. A hydraulic control system according to claim 2, wherein said working fluid is stored in a reservoir under an atmospheric pressure, and said hydraulic pressure source comprises an oil pump for pumping up the fluid from said reservoir, said relief line releasing said first discharge flow of the fluid from said first hydraulic cylinder, into said reservoir.

5. A hydraulic control system according to claim 2, wherein said relief line has a flow restrictor for limiting a rate of said first discharge flow of the fluid from said first hydraulic cylinder, and thereby giving a back pressure to said first hydraulic cylinder.

* * * * *